US008654466B1

(12) United States Patent
McFadyen (10) Patent No.: US 8,654,466 B1
(45) Date of Patent: Feb. 18, 2014

(54) CALCULATION OF HEAD MEDIA SEPARATION (HMS) FROM SERVO PREAMBLE IN A HARD DISK DRIVE

(75) Inventor: James P. R. McFadyen, Redwood City, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 155 days.

(21) Appl. No.: 13/300,991

(22) Filed: Nov. 21, 2011

(51) Int. Cl.
*G11B 27/36* (2006.01)
*G11B 21/02* (2006.01)

(52) U.S. Cl.
USPC .............................. 360/31; 360/75

(58) Field of Classification Search
None
See application file for complete search history.

(56) References Cited

U.S. PATENT DOCUMENTS

| | | | |
|---|---|---|---|
| 5,377,058 A | 12/1994 | Good et al. | |
| 6,501,606 B2 | 12/2002 | Boutaghou et al. | |
| 6,519,102 B1 | 2/2003 | Smith et al. | |
| 7,038,875 B2 | 5/2006 | Lou et al. | |
| 7,068,449 B2 | 6/2006 | Riddering et al. | |
| 7,068,451 B1 | 6/2006 | Wang et al. | |
| 7,253,984 B1 | 8/2007 | Patapoutian et al. | |
| 7,265,933 B1 | 9/2007 | Phan et al. | |
| 7,324,299 B1 | 1/2008 | Schreck et al. | |
| 7,330,324 B2 | 2/2008 | Morinaga et al. | |
| 7,333,290 B1 | 2/2008 | Kupferman | |
| 7,369,340 B1 | 5/2008 | Dang et al. | |
| 7,423,830 B2 | 9/2008 | Ma et al. | |
| 7,426,090 B2 | 9/2008 | Yamashita et al. | |
| 7,468,854 B2 | 12/2008 | Yamashita et al. | |
| 7,715,135 B1 | 5/2010 | Sutardja et al. | |
| 7,719,781 B2 | 5/2010 | Ehrlich et al. | |
| 7,729,079 B1 | 6/2010 | Huber | |
| 7,835,104 B2 | 11/2010 | Yamashita et al. | |
| 7,880,992 B2 | 2/2011 | Ozturk et al. | |
| 7,986,487 B1 | 7/2011 | Madden et al. | |
| 7,995,304 B2 | 8/2011 | Ozturk et al. | |
| 8,054,573 B2 | 11/2011 | Mathew et al. | |
| 8,300,349 B2 * | 10/2012 | Mathew et al. | 360/75 |
| 8,315,007 B1 | 11/2012 | Sutardja et al. | |
| 8,325,432 B2 * | 12/2012 | Mathew et al. | 360/31 |
| 2003/0043491 A1 | 3/2003 | Riddering et al. | |
| 2006/0056091 A1 * | 3/2006 | Nagano et al. | 360/55 |
| 2007/0230014 A1 | 10/2007 | Yamashita et al. | |
| 2007/0230015 A1 | 10/2007 | Yamashita et al. | |
| 2007/0268615 A1 | 11/2007 | McFadyen et al. | |
| 2008/0130159 A1 | 6/2008 | Dieron et al. | |
| 2008/0165443 A1 | 7/2008 | Moline | |
| 2008/0165446 A1 | 7/2008 | Partee | |
| 2009/0153996 A1 | 6/2009 | Ellis | |
| 2010/0128386 A1 | 5/2010 | Keizer et al. | |

* cited by examiner

*Primary Examiner* — Regina N Holder (57) ABSTRACT

A method of calculating a Head Media Separation (HMS) from a preamble of embedded servo sectors in a disk drive may include steps of reading the preamble, the read preamble being amplified by a variable gain amplifier (VGA) set at a predetermined gain; transforming samples of the read preamble into a first and a second frequency using a discrete time-to-frequency domain transform such as a Discrete Fourier Transform (DFT); calculating the ratio of the magnitude of the discrete time-to-frequency domain transform of the first frequency to the magnitude of the discrete time-to-frequency domain transform of the second frequency; determining the HMS from the calculated ratio, and enabling the predetermined gain to be updated in synchronism with the transforming step.

23 Claims, 5 Drawing Sheets

CALCULATION OF HEAD MEDIA SEPARATION (HMS) FROM SERVO PREAMBLE IN A HARD DISK DRIVE

BACKGROUND OF THE INVENTION

A large market exists for disk drives for mass-market computing devices such as desktop computers and laptop computers, as well as small form factor (SFF) disk drives for use in mobile computing devices (e.g. personal digital assistants (PDAs), cell-phones, digital cameras, etc.). To be competitive, a disk drive should be relatively inexpensive and provide substantial capacity, rapid access to data, and reliable performance.

Disk drives typically employ a moveable head actuator to frequently access large amounts of data stored on a disk. One example of a disk drive is a hard disk drive. A conventional hard disk drive has a head disk assembly ("HDA") including at least one magnetic disk ("disk"), a spindle motor for rapidly rotating the disk, and a head stack assembly ("HSA") that includes a head gimbal assembly (HGA) with a moveable head for reading and writing data. The HSA forms part of a servo control system that positions the moveable head over a particular track on the disk to read or write information from and to that track, respectively.

Typically, a conventional hard disk drive includes one or more disks in which each disk has a plurality of concentric tracks. Each surface of each disk conventionally contains a plurality of concentric data tracks angularly divided into a plurality of data sectors. In addition, special servo information may be provided on each disk to determine the position of the head.

Each of the heads typically includes a read/write transducer formed on the trailing surface of a slider. When the disk media is rotated, a thin film of air forms between the disk and an air bearing surface (ABS) of the slider. During operation of the disk drive, the head is said to "fly" over the surface of the disk, with the ABS being disposed just above the disk's surface. The thin film of air formed between the ABS and the disk surface is known as the air bearing. The very small separation distance between the transducer of the flying head and the surface of the disk is referred to as the "fly height". When the flying head is suspended above the disk in this manner, it is moved by the servo control system over a desired concentric track of the disk to access data stored on that track.

The fly height of the head is a factor affecting the density of magnetic data that can be stored on the disk. In recent years, the magnetic recording industry has strived to increase data storage density by employing various techniques aimed at decreasing the average fly height of the head over the rotating disk. Dynamic fly height (DFH) heads are utilized to fly at increasingly smaller fly heights to increase data storage capacity.

Typically, to control the fly height of a DFH head relative to a disk, power is applied in the form of current to a heater element of the DFH head which causes the DFH head to move closer to the disk. In this way, the DFH head is able to fly at a predetermined distance from the disk in order to read and write magnetic patterns to the disk. As storage capacity has increased, DFH heads are required to fly closer to disks and to maintain smaller more precise distances from the disks.

In order to characterize a DFH head to determine an optimal fly height, testing is performed to characterize the fly height of the DFH head across an applied power range. These characterization methods typically rely on spacing models that are utilized to estimate Head Media Separation (HMS). Typically, a Wallace spacing model is used. The Wallace spacing model, or Wallace spacing loss equation, expresses a relationship between the read-back voltage from the head and head/disk spacing. In particular, the Wallace spacing loss equation describes the amplitude of the read-back signal to the spacing of the head above the recording medium (HMS), which may be modeled with the following exponential:

$$HMS = e^{-kd}$$

where HMS is the fly height of the head above the disk; k is the spatial wavelength between two magnetic data transitions and d is the distance of the head above the magnetic layer in the media. Such a modeling may be used with Longitudinal Magnetic Recording (LMR) channels and also may be used with Perpendicular Magnetic Recording (PMR) channels, provided the frequency range is suitably limited. The HMS quantity, in this context, is not to be thought of as an absolute predictor of the distance of the heads above the magnetic layer of the media (in contrast to the surface thereof), but rather as an indication of change in the fly height of the heads above the magnetic layer of the media. Such an indication of the change in the fly height of heads over the magnetic layer in the spinning media may be determined by determining the HMS for two different wavelengths, which may be derived from two different frequencies of signals written on the disk.

As is known, frequency domain processing of Analog to Digital (ADC) samples is typically carried out to perform narrow band measurements (e.g. burst amplitude detection, HMS, etc.). When used to determine HMS, the frequency domain processing has been carried out on data read from either on dedicated tracks in the data area on which the two signals of different frequencies have been written or on dedicated bursts of differing frequencies in the servo area. Both of these approaches have disadvantages: dedicated data tracks require increased format complexity and are susceptible to thermal decay issues, while dedicated bursts in the servo area reduce the amount of data that can be stored on the disk. Moreover, as the read-back signal from the heads is acquired while servo processing or attempting to determine HMS, it is amplified by a Variable Gain Amplifier (VGA) whose gain may be adjusted at every sample during preamble acquisition, which is not optimal when attempting to determine HMS from multiple samples.

What are needed, therefore, are methods for determining HMS and disk drives configured to determine HMS that do not suffer from the above-described disadvantages.

SUMMARY OF THE INVENTION

An embodiment of the present invention is a method of calculating a Head Media Separation (HMS) from a preamble of at least one embedded servo sector in a disk drive, the disk drive including at least one disk. The method may include steps of reading the preamble of the at least one embedded servo sector, the read preamble being amplified by a variable gain amplifier (VGA) set at a predetermined gain; transforming samples of the at least one read preamble into a first and a second frequency using a discrete time-to-frequency domain transform; calculating a ratio of a magnitude of the discrete time-to-frequency domain transform of the first frequency to a magnitude of the discrete time-to-frequency domain transform of the second frequency; determining the HMS from the calculated ratio, and enabling the predetermined gain to be updated only at a beginning of a window of width modulo-N, wherein N is a wavelength of a lower one of the first and second frequencies.

The first frequency may be a fundamental frequency of a signal encoded within the preamble and the second frequency may be a harmonic frequency of the signal encoded within the preamble. The first and second frequencies may be a fundamental frequency and an odd harmonic frequency, respectively, of a square wave encoded with the preamble. The odd harmonic frequency may be, for example, a third harmonic frequency. The discrete time-to-frequency transform may include a Discrete Fourier Transform (DFT). The method may further include a step of updating the predetermined gain at a beginning of the window of width modulo-N and returning to the reading step with the VGA being set to the updated predetermined gain. The method may also include a step of updating the predetermined gain synchronously with the transforming step. The updating step may be carried out in a step-wise linear manner. The method may also include updating the predetermined gain in a step-wise linear manner, the updating being timed to coincide with at least some of beginnings of windows of width modulo-N and returning to the reading step with the VGA being set to the updated predetermined gain. The predetermined gain may be maintained constant between beginnings of windows of width modulo-N.

According to another embodiment thereof, the present invention is a disk drive, that may include a disk; a head configured to read and write data to the disk, and a processor, the processor being controlled by a program that causes the processor to carry out steps of: while a Variable Gain Amplifier (VGA) is set to a predetermined gain, receiving an output of the head amplified by the predetermined gain, the amplified output including a signal representative of the preamble of the at least one embedded servo sector; transforming samples of the at least one read preamble into a first and a second frequency using a discrete time-to-frequency domain transform; calculating a ratio of a magnitude of the discrete time-to-frequency domain transform of the first frequency to a magnitude of the discrete time-to-frequency domain transform of the second frequency; determining a Head Media Separation (HMS) from the calculated ratio, and enabling the predetermined gain to be updated only at a beginning of a window of width modulo-N, in which N is a wavelength of a lower one of the first and second frequencies.

The first frequency may be a fundamental frequency of a signal encoded within the preamble and the second frequency may be a harmonic frequency of the signal encoded within the preamble. The first and second frequencies may be a fundamental frequency and an odd harmonic frequency, respectively, of a square wave encoded with the preamble. The odd harmonic frequency may be, for example, a third harmonic frequency. The discrete time-to-frequency transform may include a Discrete Fourier Transform (DFT). The program may be further configured to carry out steps of updating the predetermined gain at a beginning of the window of width modulo-N and returning to the reading step with the VGA being set to the updated predetermined gain. The program may be also be configured to carry out a step of updating the predetermined gain synchronously with the transforming step. The program may be further configured to carry out a step of updating the predetermined gain in a step-wise linear manner. The program may also be configured to carry out steps of updating the predetermined gain in a step-wise linear manner, the updating being timed to coincide with at least some of beginnings of windows of width modulo-N and returning to the reading step with the VGA being set to the updated predetermined gain. A step of maintaining the predetermined gain constant between beginnings of windows of width modulo-N may also be carried out by the program.

According to still another embodiment thereof, the present invention is a method of calculating a Head Media Separation (HMS) from a preamble of at least one embedded servo sector in a disk drive, the disk drive including at least one disk. Such a method may include steps of reading the preamble of the at least one embedded servo sector, the read preamble being amplified by a variable gain amplifier (VGA) set at a predetermined gain; transforming samples of the at least one read preamble into a first and a second frequency using a discrete time-to-frequency domain transform; calculating a ratio of a magnitude of the discrete time-to-frequency domain transform of the first frequency to a magnitude of the discrete time-to-frequency domain transform of the second frequency; determining the HMS from the calculated ratio, and enabling the predetermined gain to be updated in synchronism with the transforming step.

According to further embodiments, the present method may also include a step of updating the predetermined gain in synchronism with the transforming step and returning to the reading step with the VGA being set to the updated predetermined gain. The enabling step may include enabling the VGA to be updated at an N sample boundary, in which N is a wavelength of a lower one of the first and second frequencies transformed from the preamble of the at least one embedded servo sector.

DESCRIPTION OF THE PREFERRED EMBODIMENTS

Figure 1:
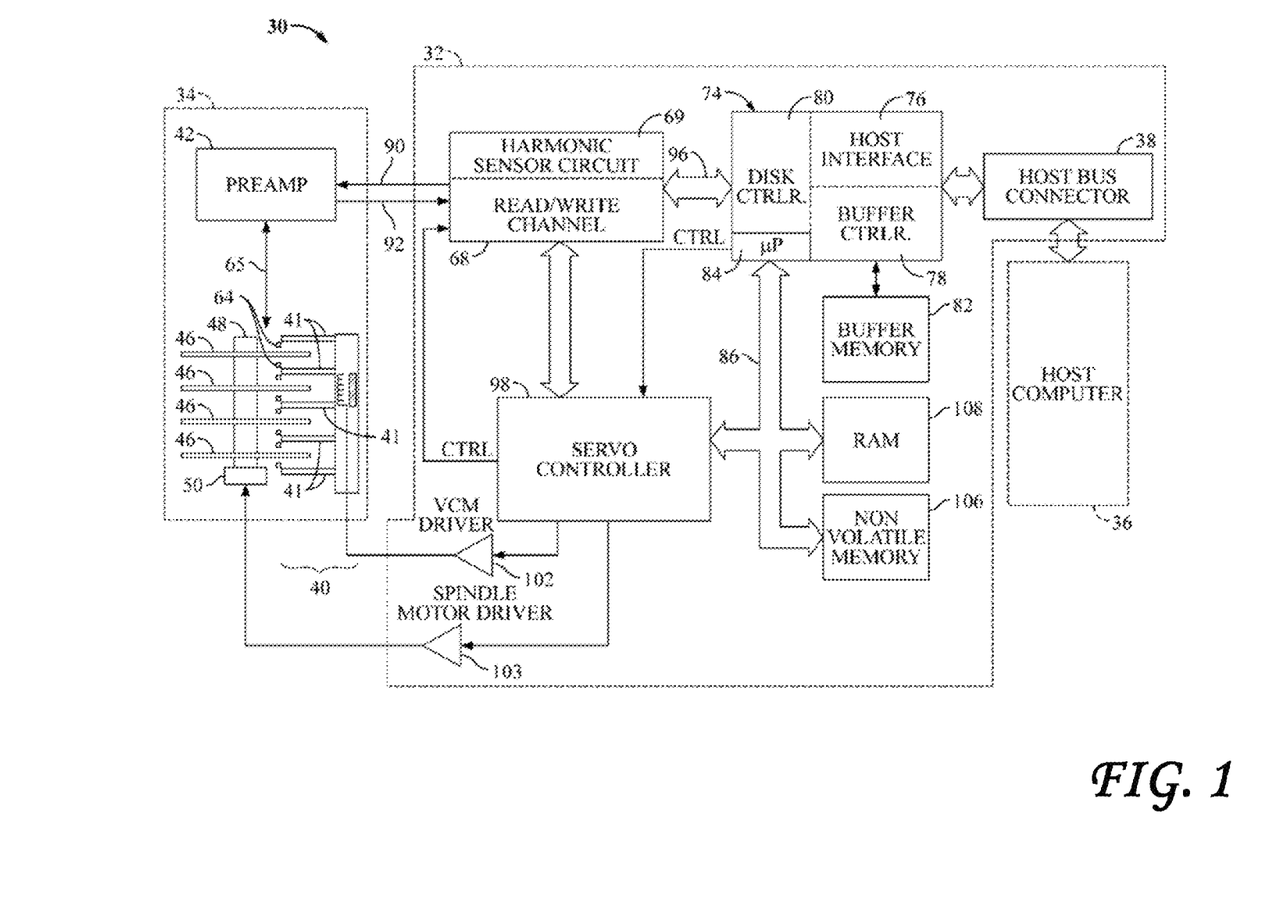
FIG. 1 shows a simplified block diagram of an exemplary disk drive, according to embodiments of the present inventions.

FIG. 1 shows a simplified block diagram of an exemplary disk drive 30 according to embodiments of the invention. Disk drive 30 may include a head/disk assembly (HDA) 34 and a controller printed circuit board assembly (PCBA) 32. Host computer 36 may be a computing device such as a desktop computer, a laptop computer, a mobile computing device (e.g. PDA, camera, cell-phone, etc.), or any type of computing device.

HDA 34 may include: one or more disks 46 for data storage; a spindle motor 50 for rapidly spinning each disk 46 (four shown) on a spindle 48; and an actuator assembly 40 for moving a plurality of heads 64 in unison over each disk 46. Actuator assembly 40 includes a plurality of actuator arms 41 having heads 64 attached to distal ends thereof, respectively, such that the actuator arms 41 and heads 64 are rotated about a pivot point so that the heads sweep radially across the disks 46, respectively.

In one embodiment, heads 64 utilized in disk drive 30 may be dynamic fly height (DFH) heads. DFH heads typically include a resistive heater element that is integrated into the head transducer at one or more locations such that by applying power in the form of current to the heater element of the DFH head, the DFH head expands perpendicularly toward the disk surface thereby adjusting the fly height of the head. Typically, DFH heads are perpendicular media recording (PMR) heads but may also be longitudinal media recording (LMR) heads. DFH heads are well known in the art. In operation, responsive to a DFH control signal (i.e., current being applied to the heating element of the head transducer), the fly height of the DFH head may be controlled.

Preamplifier 42 is connected to channel circuitry of read/write channel 68 in controller PCBA 32 via read data line 92 and write data line 90. DFH heads 64 are connected to a preamplifier 42 via a wiring assembly 65 for reading and writing data on disks 46. Preamplifier 42, a Variable Gain Amplifier (VGA), may amplify read and write signals from read/write channel 68 for transmission to DFH heads 64.

Controller PCBA 32 may include a read/write channel 68, servo controller 98, host interface and disk controller (HIDC) 74, voice coil motor driver (VCM) 102, spindle motor driver (SMD) 103, microprocessor 84, and several memory arrays, including buffer or cache memory 82, RAM 108, and non-volatile memory 106.

Host initiated operations for reading and writing data in disk drive 30 may be executed under control of microprocessor 84 connected to the controllers and memory arrays via a bus 86. Program code executed by the microprocessor 84, such as code configured to cause the microprocessor 84 to execute all or a portion of the embodiments of the present inventions, may be stored in non-volatile memory 106 and random access memory RAM 108. Program overlay code stored on reserved tracks of disks 46 may also be loaded into RAM 108 as required for execution.

During disk read and write operations, data transferred by preamplifier 42 may be encoded and decoded by read/write channel 68. During read operations, channel 68 may decode data into digital bits transferred on a Non-return to Zero (NRZ) bus 96 to HIDC 74. During write operations, HIDC may provide digital data over the NRZ bus to channel 68 which encodes the data prior to its transmittal to preamplifier 42. As one example, channel 68 may employ Partial Response Maximum Likelihood (PRML) coding techniques, although other coding processes may also be utilized. Additionally, read/write channel 68 may include a harmonic sensor circuit 69. Harmonic sensor circuit 69 may be utilized to generate data frequencies from patterns read by DFH heads 64, as will be described.

HIDC 74 may comprise a disk controller 80 for formatting and providing error detection and correction of disk data, a host interface controller 76 for responding to commands from host 36, and a buffer controller 78 for storing data which is transferred between disks 46 and host 36. Collectively the controllers in HIDC 74 provide automated functions which assist microprocessor 84 in controlling disk operations. HDIC 74 communicates with the host 36 via a Host Bus Connector 38.

Servo controller 98 provides an interface between microprocessor 84 and actuator assembly 40 and spindle motor 50. Microprocessor 84 commands logic in servo controller 98 to position actuator assembly 40 using a VCM driver 102 and to precisely control the rotation of spindle motor 50 with a spindle motor driver 103. For example, disk drive 30 may employ a sampled servo system in which equally spaced servo sectors are recorded on each track of each disk 46, as shown in and described relative to FIG. 2. Data sectors are recorded in the intervals between servo sectors on each track. Servo sectors are sampled at regular intervals by servo controller 98 to provide servo position information to microprocessor 84. Servo sectors are received by channel 68, and are processed by servo controller 98 to provide position information to microprocessor 84 via bus 86.

Once DFH head 64 is generally over a desired track 12, servo controller 98 uses the servo bursts (reference 56 in FIG. 2) of a servo sector to keep DFH head 64 over the track in a "track follow" mode. During track following mode, DFH head 64 repeatedly reads a sector ID 26 of each successive servo sector to obtain the binary encoded sector ID number that identifies each sector of the track. Based on the track ID and the sector ID, servo controller 98 continuously knows where DFH head 64 is relative to disk 46 and communicates this to microprocessor 84. In this way, the microprocessor 84 continuously knows where the DFH head 64 is relative to the disk and can command the movement of the DFH head 64, via the servo control system, to implement disk drive operations, such as seeking, tracking, read/write operations, etc.

In one embodiment, disk drive 30 may be configured, according to embodiments of the present inventions, to monitor the relative fly height of the DFH heads 64 by calculating the HMS of the read/write heads 64 over the magnetic recording layer of the disks 46. This HMS may then be used in a closed loop fashion to control the current to the heater elements of the DFH head 64 to control their fly height over the magnetic layer of the disks 46. In particular, microprocessor 84 (hereinafter termed processor) of disk drive 30 may operate under the control of a program or routine (stored, e.g., in non-volatile memory 106) to execute methods and processes in accordance with embodiments of the invention related to determining the HMS of the DFH heads 64. Alternatively, host computer 36 having a processor, memory, etc., may perform this processing instead of disk drive 30 to determine the HMS by implementing the operations to be hereinafter described utilizing its own processing capabilities. Therefore, it should be appreciated that either disk drive 30 or host computer 36 may implement these operations.

Figure 2:
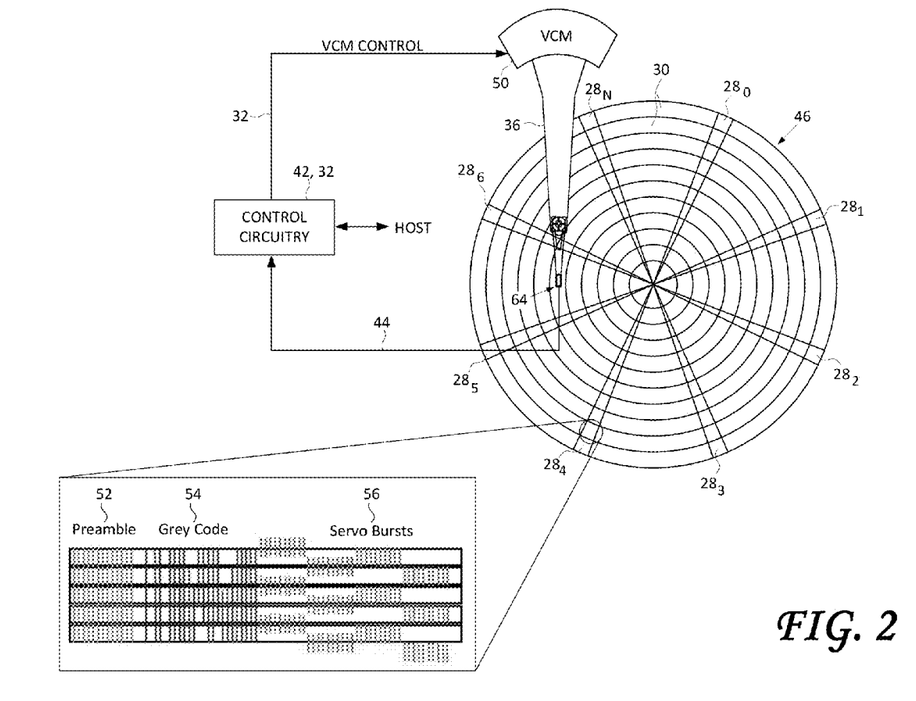
FIG. 2 shows a disk that including a plurality radially-oriented wedges of embedded servo sectors, which are used by the present methods and disk drives, according to embodiments of the present inventions.

FIG. 2 shows a disk 46, a head 64 actuated over the disk 46, and control circuitry (including preamplifier 42 and PCBA 32) that is configured to communicate with the host (36 in FIG. 1) and that is operable, among other automated functions, to determine the HMS during operation of the disk drive, control the fly height of the heads 64 via signals received from the heads 64 via Write, Read and Fly Height signals 44. In the embodiment of FIG. 2, the disk 46 includes a plurality of spaced and radially-oriented embedded servo sectors $28_0$-$28_N$ and a plurality of tracks 30. As shown, each servo sector 28 may include a preamble 52 used for automatic gain control, Grey Code 54 that includes head positioning information such as an identification of the current cylinder and track for coarse positioning during seeks, and servo bursts 56 for fine positioning while tracking the centerline of a target track during write/read operations. The control circuitry 42, 32 processes a read signal originating from the heads 64 to demodulate the servo sectors into a position error signal (PES). The PES is filtered with a suitable compensation filter to generate a control signal 32 applied to a Voice Coil Motor (VCM) 50 that rotates an actuator arm 36 about a pivot in a direction that reduces the PES.

Any suitable heads 64 may be employed in the embodiments of the present invention, and in one embodiment, the heads 64 include a slider with an integrated write element (e.g., an inductive coil) and a read element (e.g., a magnetoresistive element). The slider comprises at least one surface forming a capacitor plate which together with the surface of the disk forms a capacitance that varies inversely with the fly height.

As noted above, when used to determine HMS, the frequency domain processing has conventionally been carried out on data read from either on dedicated tracks in the data area on which the two different frequencies are written or on dedicated bursts in the servo area.

According to embodiments of the present invention, the servo preamble is used for HMS measurement, as it is pre-existing on the disk, includes a pattern that is suitable for such HMS measurements and is already used for servo processing. With reference to FIG. 1, an output signal from the preamplifier 42 is amplified by a VGA in the read channel 68, equalized by a variable equalizer, and subjected to sampling by an ADC so as to be converted into digital data. The VGA feedback loop is active in the time period during which the servo preamble 52 is being read. Indeed, the pattern stored in the preamble portion of the servo sectors is used by the read channel 68 to continuously converge on an appropriate VGA gain for reading the data to next pass under the head 64. However, this continuous adjustment of the gain of the VGA loop can corrupt the HMS results, as consecutive read samples are subjected to different amplifications. Embodiments of the present inventions, however, enable continuous measurement of HMS while the VGA gain loop is active as the heads 64 read the servo preamble 52, without requiring an interruption of the gain adjustments of the VGA loop or requiring the drive to enter into any special or dedicated HMS-measuring modes.

Embodiments of the present inventions enable an accurate magnetic fly height measurement estimate (e.g., an HMS measurement) from servo preamble samples while maintaining an active VGA gain loop. According to embodiments of the present inventions, HMS calculations may be carried out using a two frequency measurement (Wallace) model in which first and second frequencies used in the HMS calculation are obtained via a time-to-frequency domain transform of samples of the signal encoded in the preamble 52 of the embedded servo sector in the disk's magnetic media. For example, the signal encoded within the preamble 52 of embedded servo sectors may approximate a square wave, and the first frequency may include the fundamental frequency and the second frequency may include an odd harmonic of a time-to-frequency domain transform of the square wave signal encoded within the preamble 52 of the servo sector being read. One example of a suitable time-to-frequency domain transform is the Discrete Fourier Transform (DFT).

To do so, embodiments of the present invention synchronize VGA gain updates during gain acquisition with the time-to-frequency domain transform processing of the preamble 52. Indeed, if carried out during servo processing of the preamble, HMS measurements can be performed without the VGA loop affecting results. This is because the gain of the VGA loop will be the same for all samples being DFT-processed, with the VGA gain updates only affecting the next frame of samples to be DFT-processed. By synchronizing VGA gain updates such that they occur synchronously with the (e.g., beginning of the) two-frequency DFT accumulation, followed by further VGA updates only at (e.g., some or every) beginnings of a window of width modulo-N, the VGA gain adjustments will not impact the ratio of the two DFT results. For example, the VGA updates may be enabled only at N sample boundaries, or at boundaries of windows of width modulo-N, where N is the wavelength of the lower of the two frequencies being processed via the DFTs. By enabling the gain of the VGA loop to be updated only at beginnings of windows of width modulo-N such as, for example, at N sample boundaries during at least one rotation of the disk(s), the gain will remain constant for all samples between the N sample boundaries (i.e., within the window of width modulo-N) during that rotation of the disk(s) and the ratio of the DFTs of the two frequencies will effectively cancel out the effect of the gain, as the same gain (whether just updated or not) is applied to both frequencies. Stated differently, during each N sample period of the DFT integration (—that is, within the window of width modulo-N), both DFTs (i.e., the DFT of the fundamental frequency and the DFT of the third harmonic of the square wave encoded within the preamble 52 of the servo sector) would experience the same VGA gain and the gain's contribution would scale both DFTs by the same amount. Since the HMS is determined from the ratio of the DFTs, it will be unaffected by the VGA loop activity. This effectively allows HMS to be determined from servo preamble samples with an active VGA gain loop.

Figure 3:
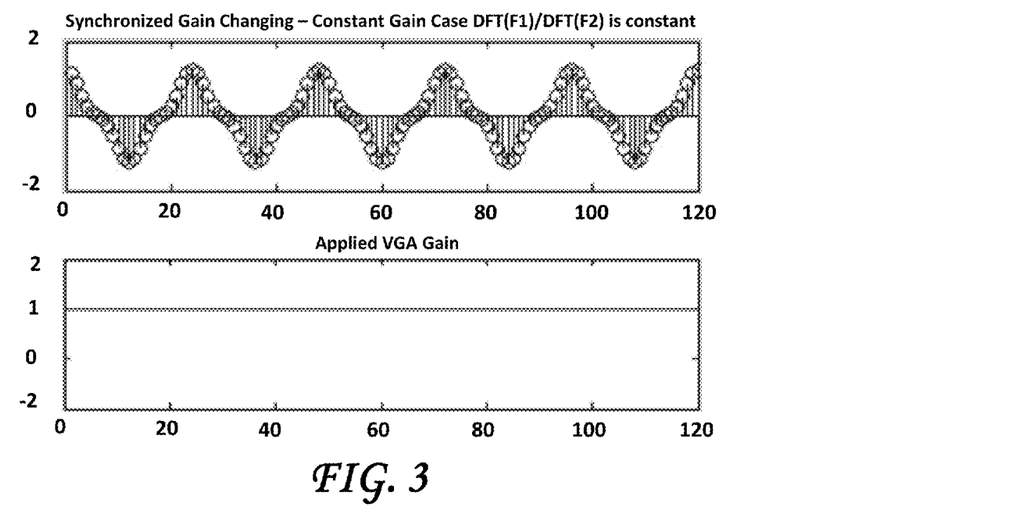
FIG. 3 shows a graph of the ratio of DFTs of first and second frequencies suitable for determining HMS and a graph showing a constant gain, according to embodiments of the present inventions.

FIG. 3 shows a time-domain waveform where the ratio of DFTs of first and second frequencies is suitable for determining HMS and a graph showing a constant gain, according to embodiments of the present inventions. As shown therein, the top graph of FIG. 3 graphically shows a time-domain waveform where the ratio of DFTs of the first and second frequencies of a modeled servo sector preamble 52 read-back signal in which the first frequency F1 corresponds to the fundamental frequency of the square wave of the preamble 52 and the second frequency F2 corresponds to the third harmonic of the square wave of the preamble 52. Note that embodiments of the present invention may be readily applied to first and second frequencies written to disk on a dedicated track or to first and second frequencies written or on dedicated bursts in the servo area, for example. However, although signals of two different frequencies may be written to disk for the purposes of supplying the requisite first and second frequencies for the ratio of DFTs, a single non-sinusoidal signal such as the square wave approximation encoded within the preamble may supply the needed first and second frequencies as the fundamental and odd harmonic, respectively, of a same (e.g., square wave) signal. In the case of the example shown in FIG. 3, the odd harmonic is F2, which corresponds to the third harmonic of the square wave encoded within the preamble 52 of the servo sector. The top graph of FIG. 3 shows 5 cycles of simulated servo preamble samples, each cycle comprising a 24T wavelength pattern (constructed with first or fundamental and third harmonics where the third harmonic is one-quarter the amplitude of the fundamental). The ratio of the DFT of the fundamental and third harmonics as calculated from the samples is also shown in the figure (ratio is 1/(¼) or 4.00). In FIG. 3, the gain applied by the VGA to the read samples is constant and is set at an arbitrary value of 1. Thus, all samples, across all five cycles, are amplified by the same and constant value of 1. Therefore, the unity constant gain scales both DFTs by the same amount.

Figure 4:
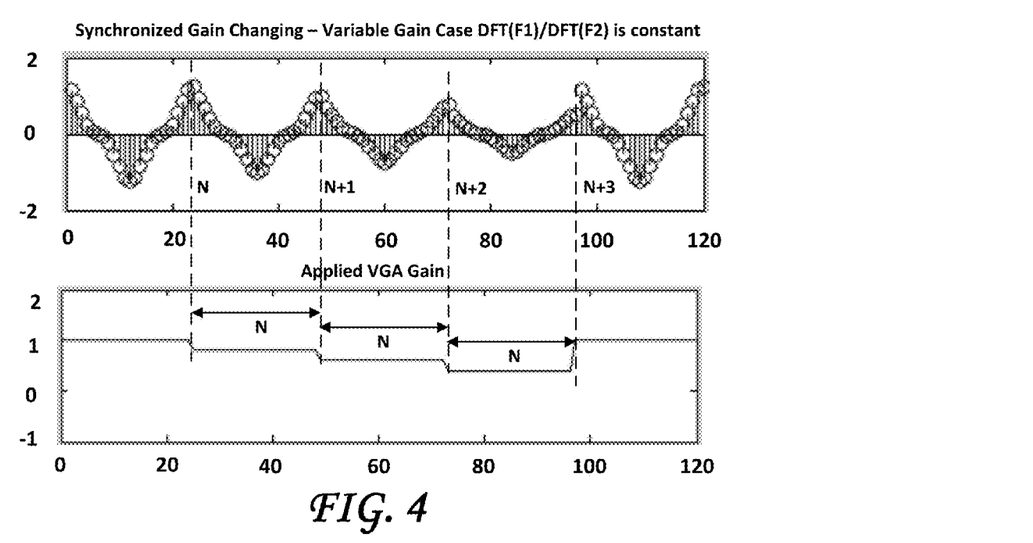
FIG. 4 shows a graph of the ratio of DFTs of first and second frequencies suitable for determining HMS and a graph showing a synchronized step-wise variable gain, according to embodiments of the present inventions.

FIG. 4 shows the case wherein the gain of the VGA is variable, with the updates thereto being synchronized with the DFT calculations. In this case, the updates to the gain of the VGA are synchronized with the N sample boundaries, in which N is the wavelength of the lower one of the first and second frequencies obtained via a time-to-frequency domain transform of the a signal encoded with the preamble of the servo sectors, according to embodiments of the present inventions. As can be seen therein, the gain (shown in the lower of the two graphs of FIG. 4) is updated in a step-wise manner and at a timing that is coincident with the N sample boundaries N, N+1, N+2 . . . . These boundaries correspond to the boundaries of the DFT data corresponding to the fundamental frequency of the square wave obtained via the DFT of the signal encoded within the preamble 52. Between such boundaries, the gain remains constant. As alluded to above, the gain is enabled to be updated (and may, in fact, be updated) at the onset of the DFT processing for each set of 24 samples spanning the N boundaries. As shown in FIG. 4, the gain varies from about 1 to about 0.8 at boundary N, down to about 0.6 at the N+1 boundary, down to about 0.5 at the N+2 boundary and is updated back up to about 1 at the N+3 boundary. All the while, the ratio of the magnitude of the DFT of the first frequency F1 to the magnitude of the DFT of the second frequency F2 remains constant, at about 4, the same ratio as shown in FIG. 3. This is because the gain, while being updated at the N boundaries, is maintained constant between such boundaries, thereby scaling both DFTs by the same amount and maintaining the ratio thereof substantially constant. The ratio of the DFT of the first frequency to the DFT of the second frequency, therefore, is identical or substantially identical in both cases; namely, the case wherein the VGA gain is maintained constant across all cycles of simulated servo preamble samples and the case wherein the VGA gain is enabled to be updated synchronously with the N boundaries across the cycles of simulated servo preamble samples. That the calculated DFT ratio in the amplitude modulated case of FIG. 4 is identical or substantially identical to the un-modulated case (4.00) of FIG. 3 demonstrates the substantial immunity of the DFT ratio with synchronous VGA gain changes carried out according to embodiments of the present inventions.

Figure 5:
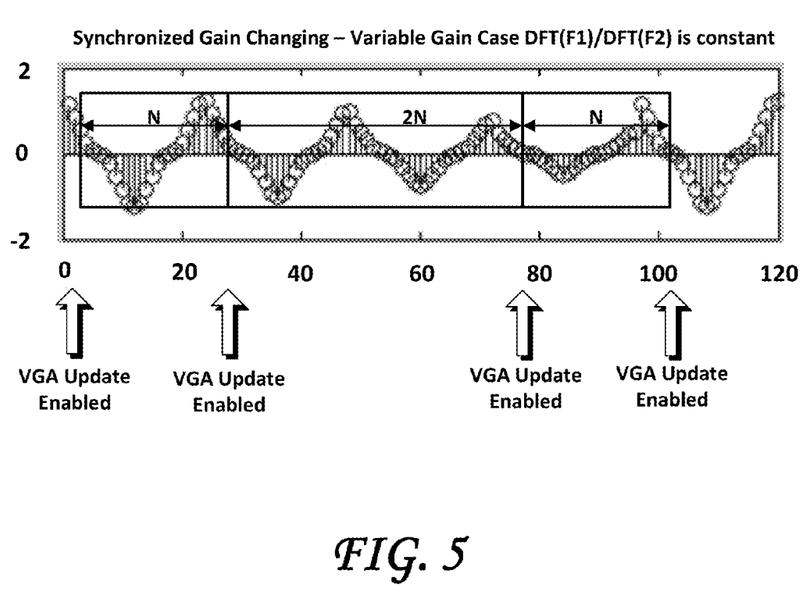
FIG. 5 shows a graph of the ratio of DFTs of first and second frequencies suitable for determining HMS, showing other possible timings of the updates to the VGA gain, according to further embodiments of the present inventions

FIG. 5 shows another embodiment of the present inventions in which the gain of the VGA is variable, with the updates thereto being synchronized with the DFT calculations. In this case, the updates to the gain of the VGA are synchronized with beginnings of windows of width modulo-N, in which N is the wavelength of the lower one of the first and second frequencies obtained via a time-to-frequency domain transform of the a signal encoded with the preamble of the servo sectors. As long as the updates to the VGA are carried out at boundaries of windows of width modulo-N, as shown by the vertical arrows labeled "VGA Update Enabled", the updates to the gain of the VGA will not corrupt the DFT calculations or the calculation of the ratio DFT(F1)/DFT(F2). The window, therefore, may be of width N or any multiple of N, according to embodiments of the present inventions. As long as the updates to the VGA are confined to the boundaries of such windows, the DFT calculations will be scaled by the same gain and the ratio calculation will be unaffected.

Although VGA gain updates are made comparatively less frequently than conventional methods of updating the VGA gain, the adjustments that are made (e.g., in synchronism with the DFT calculations, at every N boundary or at a beginning of a window of width modulo-N) are based on a comparatively greater number of samples and may be, therefore, comparatively more precise than the more incremental updates conventionally carried out for each sample. Therefore, the VGA gain loop in the present embodiments is just as effective in converging to a final value as in conventional methods.

Advantageously, using the servo preamble for continuously available HMS measurements allows for an efficient use of already present resources on the disk; namely, the servo sector's preamble 52. The HMS measurement data is periodically available as the servo wedges rotate under the read head and is made without using any additional disk area or requiring any special modes to collect HMS data. Closed loop fly height control may be able to better utilize the HMS data in this manner.

Figure 6:
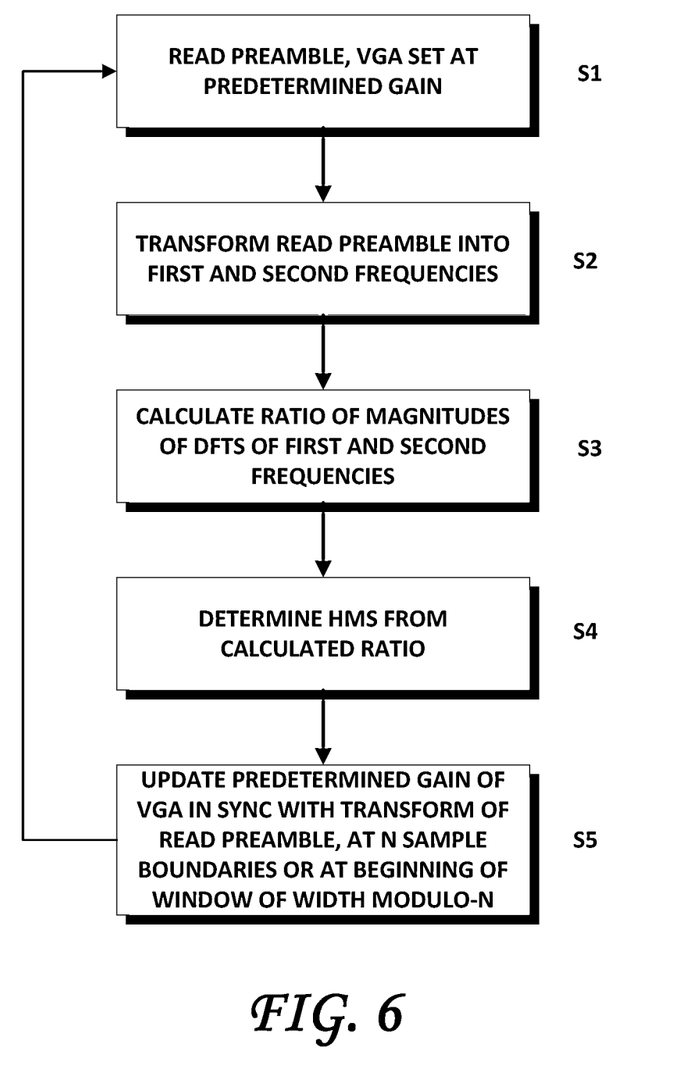
FIG. 6 shows a flowchart of a method for determining HMS, according to embodiments of the present inventions.

FIG. 6 shows a flowchart of a method of measuring HMS, according to embodiments of the present inventions. As shown therein, S1 calls for a step of reading the preamble of one or more one embedded servo sector(s), with the read preamble(s) being amplified by a variable gain amplifier (VGA) set at a predetermined gain. Step S2 calls for obtaining a first and a second frequency from a discrete time-to-frequency domain transform (such as the DFT) of the signal encoded within the preamble 52. In S3, the present method calls for calculating a ratio of a magnitude of the discrete time-to-frequency domain transform (e.g., DFT) of the first frequency to a magnitude of the discrete time-to-frequency domain transform of the second frequency. In step S4, the HMS may be determined from, e.g., the Wallace spacing method, from the calculated ratio. The predetermined gain of the VGA may then be enabled to be updated (or, in fact, updated) in synchronism with the discrete time-to-frequency transforms, at N sample boundaries or at beginnings of windows of width modulo-N, with N being a wavelength of a lower one of the first and second frequencies obtained via DFT of the preamble(s) of the embedded servo sector(s), as shown at reference S5.

While certain embodiments of the inventions have been described, these embodiments have been presented by way of example only, and are not intended to limit the scope of the inventions. Indeed, the novel methods, devices and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, those skilled in the art will appreciate that in various embodiments, the actual steps taken in the processes shown in FIGS. 1-6 may differ from those shown in the figures. Depending on the embodiment, certain of the steps described in the example above may be removed, others may be added, and the sequence of steps may be altered and/or performed in parallel. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A method of calculating a Head Media Separation (HMS) from a preamble of at least one embedded servo sector in a disk drive, the disk drive including at least one disk, comprising:
   reading the preamble of the at least one embedded servo sector, the read preamble being amplified by a variable gain amplifier (VGA) set at a predetermined gain;
   transforming samples of the at least one read preamble into a first and a second frequency using a discrete time-to-frequency domain transform;
   calculating a ratio of a magnitude of the discrete time-to-frequency domain transform of the first frequency to a magnitude of the discrete time-to-frequency domain transform of the second frequency;
   determining the HMS from the calculated ratio; and enabling the predetermined gain to be updated only at a beginning of a window of width modulo-N, wherein N is a wavelength of a lower one of the first and second frequencies.

2. The method of claim 1, wherein the first frequency is a fundamental frequency of a signal encoded within the preamble and wherein the second frequency is a harmonic frequency of the signal encoded within the preamble.

3. The method of claim 1, wherein the first and second frequencies are a fundamental frequency and an odd harmonic frequency, respectively, of a square wave encoded with the preamble.

4. The method of claim 3, wherein the odd harmonic frequency is a third harmonic frequency.

5. The method of claim 1, wherein the discrete time-to-frequency transform includes a Discrete Fourier Transform (DFT).

6. The method of claim 1, further including a step of updating the predetermined gain at a beginning of the window of width modulo-N and returning to the reading step with the VGA being set to the updated predetermined gain.

7. The method of claim 1, further including a step of updating the predetermined gain synchronously with the transforming step.

8. The method of claim 7, wherein the updating step is carried out in a step-wise linear manner.

9. The method of claim 1, further including a step of updating the predetermined gain in a step-wise linear manner, the updating being timed to coincide with at least some of beginnings of windows of width modulo-N and returning to the reading step with the VGA being set to the updated predetermined gain.

10. The method of claim 1, wherein the predetermined gain is maintained constant between beginnings of windows of width modulo-N.

11. A disk drive, comprising:
 a disk;
 a head configured to read and write data to the disk, and
 a processor, the processor being controlled by a program that causes the processor to carry out steps of:
  while a Variable Gain Amplifier (VGA) is set to a predetermined gain, receiving an output of the head amplified by the predetermined gain, the amplified output including a signal representative of the preamble of the at least one embedded servo sector;
  transforming samples of the at least one read preamble into a first and a second frequency using a discrete time-to-frequency domain transform;
  calculating a ratio of a magnitude of the discrete time-to-frequency domain transform of the first frequency to a magnitude of the discrete time-to-frequency domain transform of the second frequency;
  determining a Head Media Separation (HMS) from the calculated ratio, and
  enabling the predetermined gain to be updated only at a beginning of a window of width modulo-N, wherein N is a wavelength of a lower one of the first and second frequencies.

12. The disk drive of claim 11, wherein the first frequency is a fundamental frequency of a signal encoded within the preamble and wherein the second frequency is a harmonic frequency of the signal encoded within the preamble.

13. The disk drive of claim 11, wherein the first and second frequencies are a fundamental frequency and an odd harmonic frequency, respectively, of a square wave encoded with the preamble.

14. The disk drive of claim 13, wherein the odd harmonic frequency is a third harmonic frequency.

15. The disk drive of claim 13, wherein the discrete time-to-frequency transform includes a Discrete Fourier Transform (DFT).

16. The disk drive of claim 13, wherein the program is further configured to carry out steps of updating the predetermined gain at a beginning of the window of width modulo-N and returning to the reading step with the VGA being set to the updated predetermined gain.

17. The disk drive of claim 13, wherein the program is further configured to carry out a step of updating the predetermined gain synchronously with the transforming step.

18. The disk drive of claim 17, wherein the program is further configured to carry out a step of updating the predetermined gain in a step-wise linear manner.

19. The disk drive of claim 13, wherein the program is further configured to carry out steps of updating the predetermined gain in a step-wise linear manner, the updating being timed to coincide with at least some of beginnings of windows of width modulo-N and returning to the reading step with the VGA being set to the updated predetermined gain.

20. The disk drive of claim 13, wherein the program is further configured to carry out a step of maintaining the predetermined gain constant between beginnings of windows of width modulo-N.

21. A method of calculating a Head Media Separation (HMS) from a preamble of at least one embedded servo sector in a disk drive, the disk drive including at least one disk, comprising:
 reading the preamble of the at least one embedded servo sector, the read preamble being amplified by a variable gain amplifier (VGA) set at a predetermined gain;
 transforming samples of the at least one read preamble into a first and a second frequency using a discrete time-to-frequency domain transform;
 calculating a ratio of a magnitude of the discrete time-to-frequency domain transform of the first frequency to a magnitude of the discrete time-to-frequency domain transform of the second frequency;
 determining the HMS from the calculated ratio; and
 enabling the predetermined gain to be updated in synchronism with the transforming step.

22. The method of claim 21, further comprising a step of updating the predetermined gain in synchronism with the transforming step and returning to the reading step with the VGA being set to the updated predetermined gain.

23. The method of claim 21, wherein the enabling step includes enabling the VGA to be updated at an N sample boundary, wherein N is a wavelength of a lower one of the first and second frequencies transformed from the preamble of the at least one embedded servo sector.

* * * * *